United States Patent
Chen et al.

(10) Patent No.: US 9,792,864 B2
(45) Date of Patent: Oct. 17, 2017

(54) DISPLAY PANEL

(71) Applicant: INNOLUX CORPORATION, Chu-Nan, Miao-Li County (TW)

(72) Inventors: Chien-Hung Chen, Chu-Nan (TW); Hsin-Yu Lee, Chu-Nan (TW); Hsia-Ching Chu, Chu-Nan (TW); Kuei-Ling Liu, Chu-Nan (TW)

(73) Assignee: INNOLUX CORPORATION, Jhu-Nan (TW)

( * ) Notice: Subject to any disclaimer, the term of this patent is extended or adjusted under 35 U.S.C. 154(b) by 184 days.

(21) Appl. No.: 14/668,910

(22) Filed: Mar. 25, 2015

(65) Prior Publication Data
US 2016/0042705 A1    Feb. 11, 2016

(30) Foreign Application Priority Data

Aug. 8, 2014   (TW) .............................. 103127195 A

(51) Int. Cl.
*G02F 1/1337*   (2006.01)
*G09G 3/36*   (2006.01)

(52) U.S. Cl.
CPC ..... *G09G 3/3607* (2013.01); *G02F 1/133707* (2013.01); *G09G 3/3648* (2013.01); *G09G 3/3674* (2013.01); *G09G 3/3685* (2013.01); *G02F 2001/13373* (2013.01); *G02F 2001/133757* (2013.01); *G09G 2300/0426* (2013.01)

(58) Field of Classification Search
CPC ................................................. G02F 1/133707
USPC .................................................. 349/139–148
See application file for complete search history.

(56) References Cited

U.S. PATENT DOCUMENTS

2011/0025970 A1    2/2011 Hashimoto et al.
2013/0120670 A1*   5/2013 Chen .................... G02F 1/1337
                                                                348/792

OTHER PUBLICATIONS

Jung, et al., "Splay and Bend Disclinations in Multidomain Vertical-Alignment Liquid-Crystal Cells", Physical Review E 86, 011702 (2012), pp. 011702-1-011702-8.
(Continued)

*Primary Examiner* — Michael Pervan
(74) *Attorney, Agent, or Firm* — Liu & Liu

(57) ABSTRACT

A display panel is disclosed, comprising: a first electrode comprising a first trunk electrode and a second trunk electrode and a second electrode comprising a third trunk electrode and a fourth trunk electrode formed thereon, wherein when light passes through the display panel, the first and second trunk electrode respectively correspond to first and second dark lines crossing to each other to form a first cross site, the third and fourth trunk electrode respectively correspond to third and fourth dark lines crossing to each other to form a second cross site, the first and third dark lines respectively comprise first and second arc portions at the first and second cross sites near to a first scan line, and a first concave side of the first arc portion and the second concave side of the second arc portion face to sides opposite to each other.

9 Claims, 9 Drawing Sheets

(56) References Cited

OTHER PUBLICATIONS

Lee, et al., "Review Paper: Emerging Vertical-Alignment Liquid-Crystal Technology Associated with Surface Modification Using UV-Curable Monomer", Journal of the SID 17/7, (2009), pp. 551-559.
Kim, et al., "High-Transmittance Multi-Domain Vertical Alignment Liquid Crystal Device with Protrusion Structure", Journal of the Optical Society of Korea, vol. 16, No. 2, Jun. 2012, pp. 166-169.

* cited by examiner

DISPLAY PANEL

CROSS REFERENCE TO RELATED APPLICATION

This application claims the benefits of the Taiwan Patent Application Serial Number 103127195, filed on Aug. 8, 2014, the subject matter of which is incorporated herein by reference.

BACKGROUND OF THE INVENTION

1. Field of the Invention

The present invention relates to a display panel and, more particularly, to a display panel with improved light transmittance by controlling dark lines having different spin directions in sub-pixel units thereof.

2. Description of Related Art

In recent years, all the display devices are developed toward having small volume, thin thickness and light weight as the display techniques progresses. A liquid crystal display (LCD) device is a flat panel display device with a thin thickness, so a conventional cathode ray tube (CRT) display is gradually replaced by the LCD. Especially, the LCD can be applied to various fields. For example, the daily used devices such as cell phones, notebooks, video cameras, cameras, music players, navigation devices, and televisions are equipped with liquid crystal display (LCD) panels.

For the conventional LCD device, a liquid crystal layer is disposed between two electrodes, and voltage is applied onto the electrodes to control the tilt of liquid crystal molecules. Thus, it is possible to control light from a backlight module disposed below the LCD panel to pass or not pass through the liquid crystal layer, and the purpose of displaying can be achieved. In addition, the purpose of displaying different colors can be achieved through the pixel units.

As the development of the LCD panels with high display resolution, the light transmittance thereof is one factor related to the display quality of the LCD panels. Hence, many manufacturers are desired to develop LCD panels having improved light transmittance to improve the display quality thereof.

Therefore, it is desirable to provide a display panel with improved light transmittance to satisfy the requirement for high display quality.

SUMMARY OF THE INVENTION

An object of the present invention is to provide a display panel, wherein dark lines corresponding to pixel units thereof has different spin directions to improve light transmittance thereof.

To achieve the object, the display panel of the present invention comprises: a first substrate comprising a first reference line, a second reference line corresponding to the first reference line, a third reference line intersecting the first reference line and the second reference line, and a fourth reference line intersecting the first reference line and the second reference line and corresponding to the third reference line; and a first electrode and a second electrode disposed on the first substrate and locating in a region defined by the first reference line, the second reference line, the third reference line and the fourth reference line, wherein the first electrode comprises a first trunk electrode and a second trunk electrode substantially vertical to each other, the second electrode comprises a third trunk electrode and a fourth trunk electrode substantially vertical to each other, and the first trunk electrode is substantially parallel to the third trunk electrode. When light passes through the display panel, the first trunk electrode and the second trunk electrode respectively correspond to a first dark line and a second dark line which cross to each other to form a first cross site, and the third trunk electrode and the fourth trunk electrode respectively correspond to a third dark line and a fourth dark line which cross to each other to form a second cross site. Herein, the first dark line comprises a first arc portion at the first cross site near to the third reference line, the third dark line comprises a second arc portion at the second cross site near to the third reference line, and a first concave side of the first arc portion faces to the first reference line, and a second concave side of the second arc portion faces to the second reference line. Alternatively, the first dark line comprises a first protrusion part at the first cross site near to the third reference line, the third dark line comprises a second protrusion part at the second cross site near to the third reference line, the first protrusion part locates at a side of the first dark line near to the second reference line, and the second protrusion part locates at a side of the third dark line near to the first reference line.

In one aspect of the present invention, the first reference line can be a first side of the first substrate, the second reference line can be a second side thereof corresponding to the first side, the third reference line can be a third side thereof intersecting the first side and the second side, and the fourth reference line can be a fourth side thereof intersecting the first side and the second side and corresponding to the third side.

In another aspect of the present invention, the first reference line can be a first data line, the second reference line can be a second data line corresponding to the first data line, the third reference line can be a first scan line intersecting the first data line and the second data line, and the fourth reference line can be a second scan line intersecting the first data line and the second data line and corresponding to the first scan line.

In all the aspects of the present invention, preferably, the first electrode is adjacent to the second electrode. Herein, plural sub-pixel units may be disposed on the first substrate, and the first electrode and the second electrode correspond to the sub-pixel units having identical color; or plural sub-pixel units may be disposed on the first substrate, and the first electrode and the second electrode correspond to the sub-pixel units having different colors.

In addition, in all the aspects of the present invention, plural sub-pixel units may be disposed on the first substrate, and the first electrode and the second electrode correspond to one sub-pixel unit. Meanwhile, preferably, the first electrode corresponds to a second region, the second electrode corresponds to a first region, a length of the first dark line is larger than that of the second dark line, and a length of the third dark line is larger than that of the fourth dark line. When the light passes through the sub-pixel units, a spectrum of the light is obtained. Waves corresponding to the first dark line, the second dark line, the third dark line and the fourth dark line are respectively analyzed and obtained by a spectrum analysis. A slope of the wave corresponding to the second dark line at a full width at half maximum thereof is smaller than that corresponding to the first dark line at a full width at half maximum thereof, and a slope of the wave corresponding to the fourth dark line at a full width at half maximum thereof is smaller than that corresponding to the third dark line at a full width at half maximum thereof. Preferably, the slope of the wave corresponding to the second dark line at a full width at half maximum thereof is smaller than those corresponding to the first dark line, the third dark line and the fourth dark line respectively at full widths at half maximum thereof.

Furthermore, in all the aspects of the present invention, plural sub-pixel units comprising a first sub-pixel unit and a second sub-pixel unit may be disposed on the first substrate, the first electrode corresponds to the first sub-pixel unit, and the second electrode corresponds to the second sub-pixel unit. Preferably, the first sub-pixel unit is adjacent to the second sub-pixel unit. In this case, when the light passes through the sub-pixel units and waves corresponding to the first dark line, the second dark line, the third dark line and the fourth dark line are respectively obtained by a spectrum analysis, slopes of the waves corresponding to the first dark line, the second dark line, the third dark line and the fourth dark line respectively at full widths at half maximum thereof may be different to each other. Preferably, a length of the first dark line is larger than that of the second dark line, and a slope of the wave corresponding to the first dark line at a full width at half maximum thereof is larger than that corresponding to the second dark line at a full width at half maximum thereof. More preferably, in addition to a slope of the wave corresponding to the first dark line at a full width at half maximum thereof being larger than that corresponding to the second dark line at a full width at half maximum thereof, a length of the third dark line is larger than that of the fourth dark line, and a slope of the wave corresponding to the third dark line at a full width at half maximum thereof is larger than that corresponding to the fourth dark line at a full width at half maximum thereof.

Other objects, advantages, and novel features of the invention will become more apparent from the following detailed description when taken in conjunction with the accompanying drawings.

DETAILED DESCRIPTION OF THE PREFERRED EMBODIMENT

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

Figure 1:
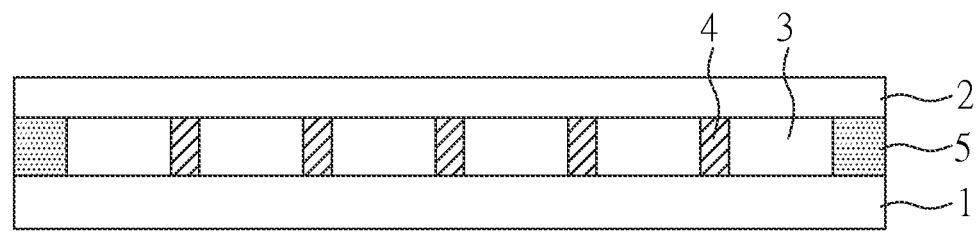
FIG. 1 is a perspective view of a liquid crystal display (LCD) panel according to one preferred embodiment of the present invention.

As shown in FIG. 1, the LCD panel of the present embodiment comprises: a thin film transistor (TFT) substrate 1; an counter substrate 2 opposite to the TFT substrate 1; plural spacers 4 disposed between the TFT substrate 1 and the counter substrate 2; a sealant 5 disposed between the TFT substrate 1 and the counter substrate 2 and locating on peripheries of the TFT substrate 1 and the counter substrate 2; and a liquid crystal layer 3 disposed in a space formed by the TFT substrate 1 and the counter substrate 2. In the present embodiment, TFT units (not shown in the figure) are disposed on the TFT substrate 1, and a color filter layer (not shown in the figure) is disposed on the counter substrate 2. However, in other embodiment of the present invention, the color filter layer (not shown in the figure) can also be disposed on the TFT substrate 1. Hereinafter, a structure of the TFT substrate 1 is described in detail.

Figure 2:
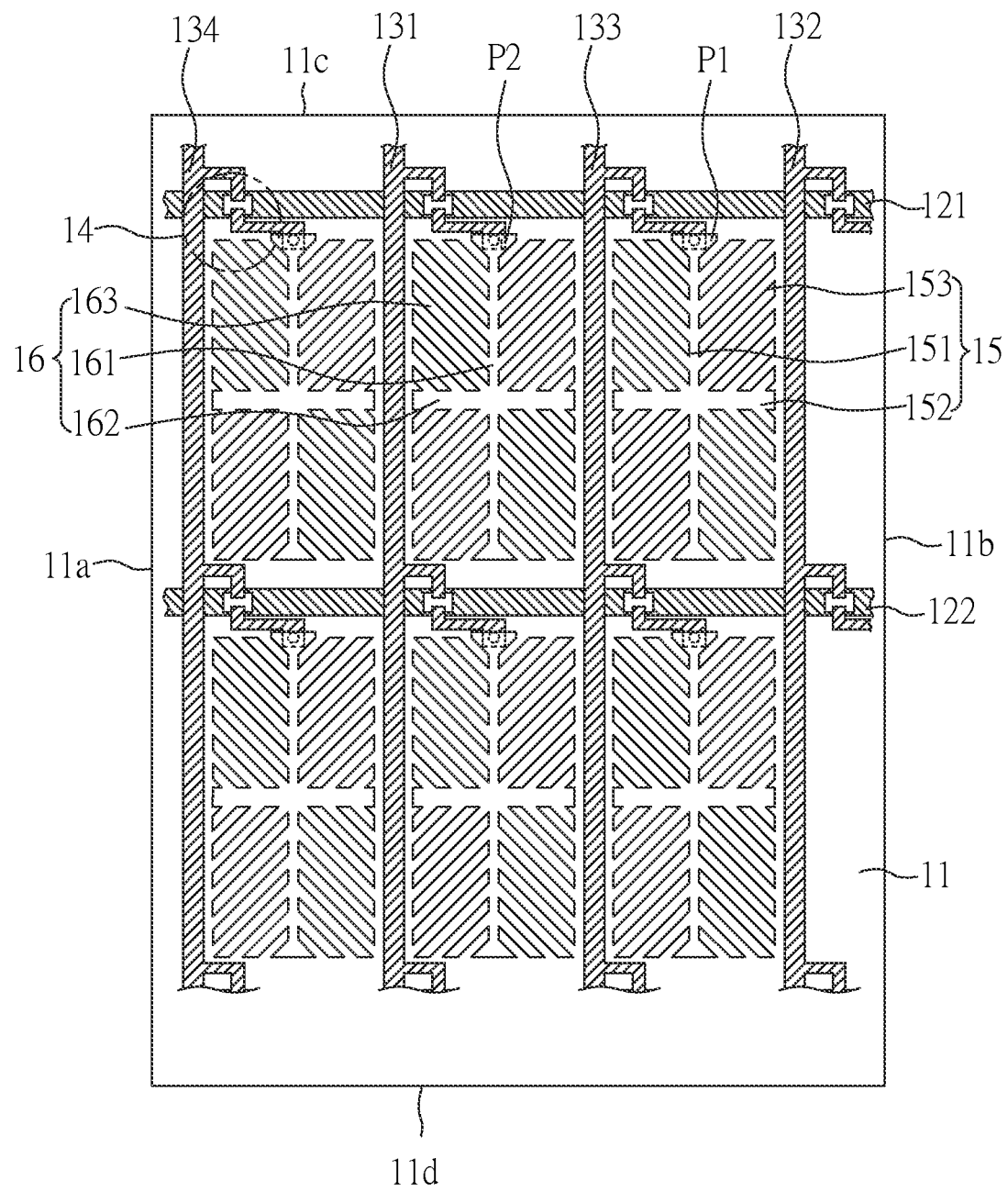
FIG. 2 is a perspective view of a first substrate of a LCD panel according to one preferred embodiment of the present invention.
Figure 3:
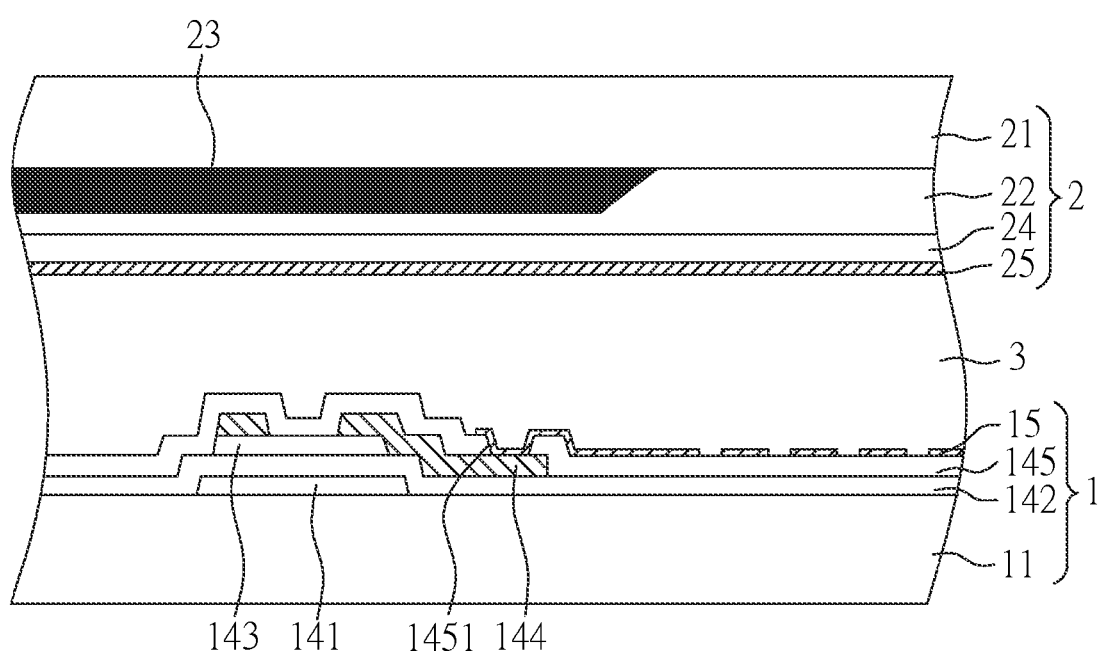
FIG. 3 is a cross-sectional view of a LCD panel according to one preferred embodiment of the present invention.

FIG. 2 is a perspective view of the TFT substrate of the LCD panel of the present embodiment, and FIG. 3 is a cross-sectional view of the LCD panel of the present embodiment. As shown in FIGS. 2 and 3, the TFT substrate of the present embodiment comprises: a first substrate 11 having a first side 11a, a second side 11b corresponding to and opposite to the first side 11a, a third side 11c intersecting the first side 11a and the second side 11b, and a fourth side 11d intersecting the first side 11a and the second side 11b, and the fourth side 11d corresponding to and opposite to the third side 11c. In addition, plural scan lines (including a first scan line 121 and a second scan line 122), plural data lines (including a first data line 131, a second data line 132 and data lines 133, 134), plural TFT units 14, a first electrode 15 and a second electrode 16 are disposed on the first substrate 11. Herein, the first data line 131 corresponds to the second data line 132, the first scan line 121 corresponds to the second scan line 122, and the first scan line 121 and the second scan line 122 respectively intersect the first data line 131 and the second data line 132.

In the present embodiment, the first data line 131 is substantially parallel to the first side 11a as a first reference line, the second data line 132 is substantially parallel to the second side 11b as a second reference line, the first scan line 121 is substantially parallel to the third side 11c as a third reference line, and the second scan line 122 is substantially parallel to the fourth side 11d as a fourth reference line. Herein, the term "substantially parallel to" refers to that an included angle between two lines/sides is in a range between 0° to 5° or the two lines/sides do not cross to each other. However, in other embodiment, one of the sides (including the first side 11a, the second side 11b, the third side 11c and the fourth side 11d) or the scan lines and the data lines (including the first data line 131, the second data line 132, the first scan line 121 and the second scan line 122) can be used as a reference line. For example, when the panel is a non-regular panel (i.e. non-rectangular panel such as panels with round, octagon or other irregular shapes), the data lines and the scan lines can be used as the reference lines. When the sub-pixel units of the panels are not arranged in an array, the sides of the first substrate can be used as the reference lines. Alternatively, in other embodiment, when the panel is a non-regular panel and the sub-pixel units thereof are not arranged in an array, dummy lines can be used as the reference lines, as long as the first electrode 15 and the second electrode 16 are located in a region defined by the reference lines.

In addition, as shown in FIGS. 2 and 3, the TFT units 14 in the LCD panel of the present embodiment comprises: a gate electrode 141 on the first substrate 11; a gate insulating layer 142 disposed on the first substrate 11 and the gate electrode 141; a semiconductor layer 143 disposed on the gate insulating layer 142; a source and drain layer 144 disposed on the semiconductor layer 143; and a protection layer 145 disposed on the gate insulating layer 142, the semiconductor layer 143 and the source and drain layer 144. Herein, the protection layer 145 has an opening 1451 to expose the source and drain layer 144, and the first electrode 15 and the second electrode 16 are disposed on the protection layer 145 and in the opening 1451 thereof to electrically connect to the source and drain layer 144. The counter substrate 2 comprises: a second substrate 21, a black matrix layer 23, a color filter layer 22, a protecting layer 24 and a counter electrode layer 25. The liquid crystal layer 3 is disposed between the TFT substrate 1 and the counter substrate 2, and alignment layers (not shown in the figures) are respectively disposed on the TFT substrate 1 and the counter substrate 2.

In the present embodiment, the first substrate 11 and the second substrate 21 can be made of any material generally used for forming substrates in the art, such as glass, plastic and flexible material. The gate electrode 141, the source and drain layer 144, the scan lines (including a first scan line 121 and a second scan line 122), the data lines (including a first data line 131, a second data line 132 and data lines 133, 134) can be made of any electrode material generally used in the art. The gate insulating layer 142 and the protection layer 145 can be made of any insulating material generally used in the art. The semiconductor layer 143 can be made of any semiconductor material generally used in the art. In addition, the first electrode 15, the second electrode 16 and the counter electrode layer 25 can be made of any transparent conductive electrode material (such as ITO, IZO or ITZO) generally used in the art. In addition, as shown in FIG. 2, the first electrode 15 and the second electrode 16 are patterned electrodes with dendritic structure, and the counter electrode layer 25 is a plane electrode. However, in other embodiments, the counter electrode layer 25 can also be a patterned electrode.

As shown in FIGS. 2 and 3, two adjacent scan lines (including the first scan line 121 and the second scan line 122) and two adjacent data lines (including the first data line 131, the second data line 132 and the data lines 133, 134) define plural sub-pixel units comprising a first sub-pixel unit P1 and a second sub-pixel unit P2. The first electrode 15 and the second electrode 16 are disposed between two adjacent scan lines (including the first scan line 121 and the second scan line 122) and two adjacent data lines (including the first data line 131, the second data line 132 and the data lines 133, 134), so that the first sub-pixel unit P1 and the second sub-pixel unit P2 respectively correspond to the first electrode 15 and the second electrode 16. In addition, the first sub-pixel unit P1 and the second sub-pixel unit P2 can correspond to different color of the color filter layer 22. In the present embodiment, the first sub-pixel unit P1 is adjacent to the second sub-pixel unit P2, and the first electrode 15 is adjacent to the second electrode 16.

In addition, as shown in FIG. 2, the first electrode 15 comprises a first trunk electrode 151 and a second trunk electrode 152 substantially vertical to each other; the second electrode 16 comprises a third trunk electrode 161 and a fourth trunk electrode 162 substantially vertical to each other; and the first trunk electrode 151 is substantially parallel to the third trunk electrode 161. Herein, the first trunk electrode 151 and the second trunk electrode 152 substantially vertical to each other means that an included angle between these two electrodes is in a range between 85° and 90°; and the third trunk electrode 161 and the fourth trunk electrode 162 substantially vertical to each other also means that an included angle between these two electrode is in a range between 85° and 90°. In addition, the first trunk electrode 151 substantially parallel to the third trunk electrode 161 means that an included angle between these two electrodes is in a range between 0° and 5° or do not cross to each other. Furthermore, in the present embodiment, a length of the first trunk electrode 151 is larger than that of the second trunk electrode 152, the first trunk electrode 151 and the second trunk electrode 152 are respectively formed in a linear shape, and the first electrode 15 further comprises branch electrodes 153 laterally extending from the first trunk electrode 151 and the second trunk electrode 152. In addition, a length of the third trunk electrode 161 is larger than that of the fourth trunk electrode 162, the third trunk electrode 161 and the fourth trunk electrode 162 are respectively formed in a linear shape, and the second electrode 16 further comprises branch electrodes 163 laterally extending from the third trunk electrode 161 and the fourth trunk electrode 162.

Figure 4:
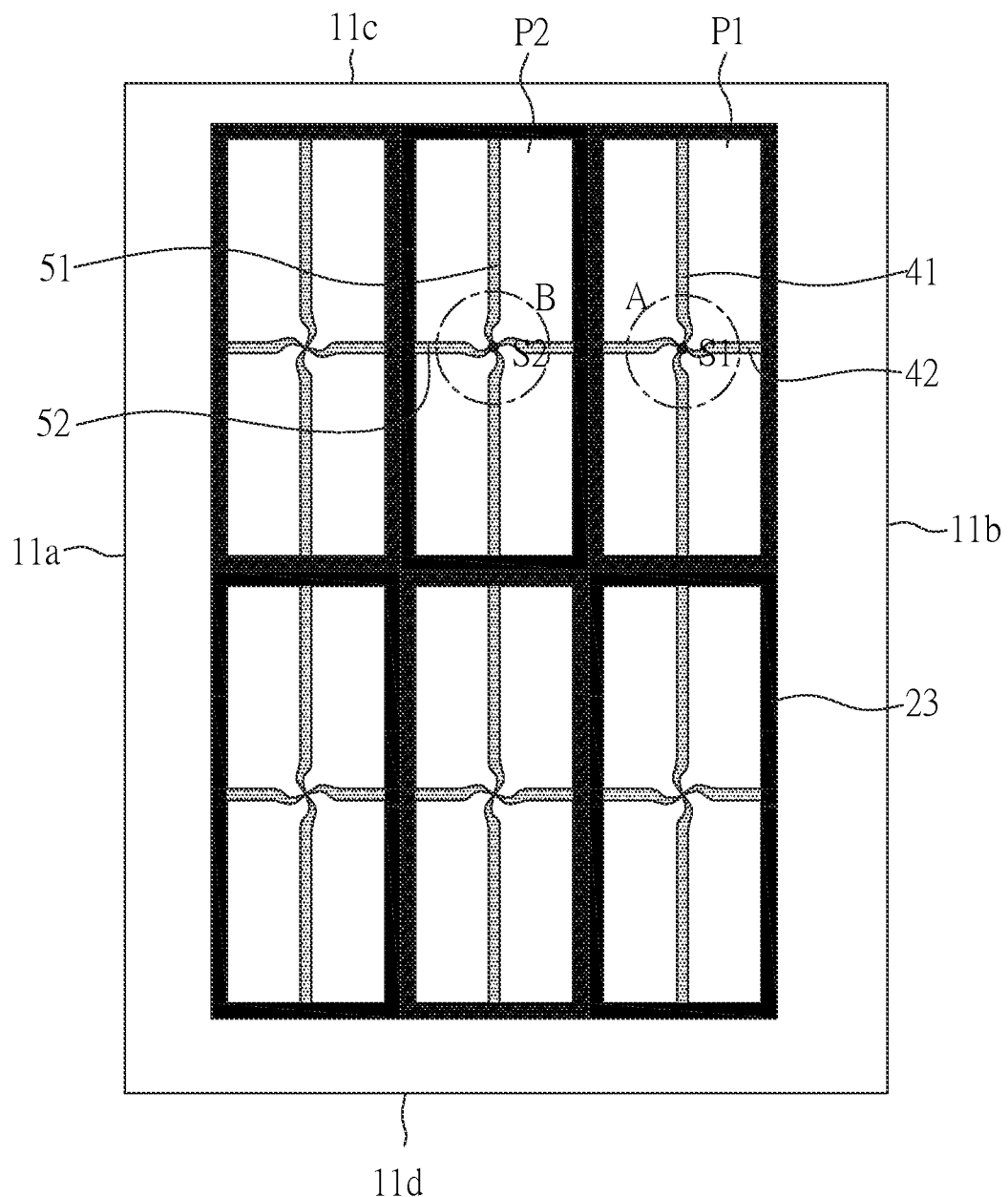
FIG. 4 is a perspective view showing dark lines corresponding to each sub-pixel unit in a LCD panel according to one preferred embodiment of the present invention.

FIG. 4 is a perspective view showing dark lines corresponding to each sub-pixel unit in the LCD panel of the present embodiment. In the present embodiment, the patterns and the widths of the dark lines can be controlled by adjusting the patterns and the widths of the first trunk electrode 151 and the second trunk electrode 152 of the first electrode 15 as well as the third trunk electrode 161 and the fourth trunk electrode 162 of the second electrode 16. Alternatively, the patterns and the widths of the dark lines can be adjusted by controlling a convergence of liquid crystal molecules with an external electric field during the photo-curing process for preparing the liquid crystal layer.

As shown in FIGS. 2 and 4, when a voltage is applied to the first electrode 15 and the second electrode 16 so that light emitting from a backlight module (not shown in figure) passes through the LCD panel, at a side of the counter substrate, the first trunk electrode 151 and the second trunk electrode 152 of the first electrode 15 corresponding to the first sub-pixel unit P1 respectively correspond to a first dark line 41 and a second dark line 42 which cross to each other to form a first cross site S1, and the third trunk electrode 161 and the fourth trunk electrode 162 of the second electrode 16 respectively correspond to a third dark line 51 and a fourth dark line 52 which cross to each other to form a second cross site S2. As shown in FIG. 4, the first dark line 41, the second dark line 42, the third dark line 51 and the fourth dark line 52 are continuous dark lines. However, in other embodiments of the present invention, the first dark line 41, the second dark line 42, the third dark line 51 and the fourth dark line 52 are non-continuous dark lines, and there may be gaps at the first cross site S1 and/or the second cross site S2.

Figure 5A:
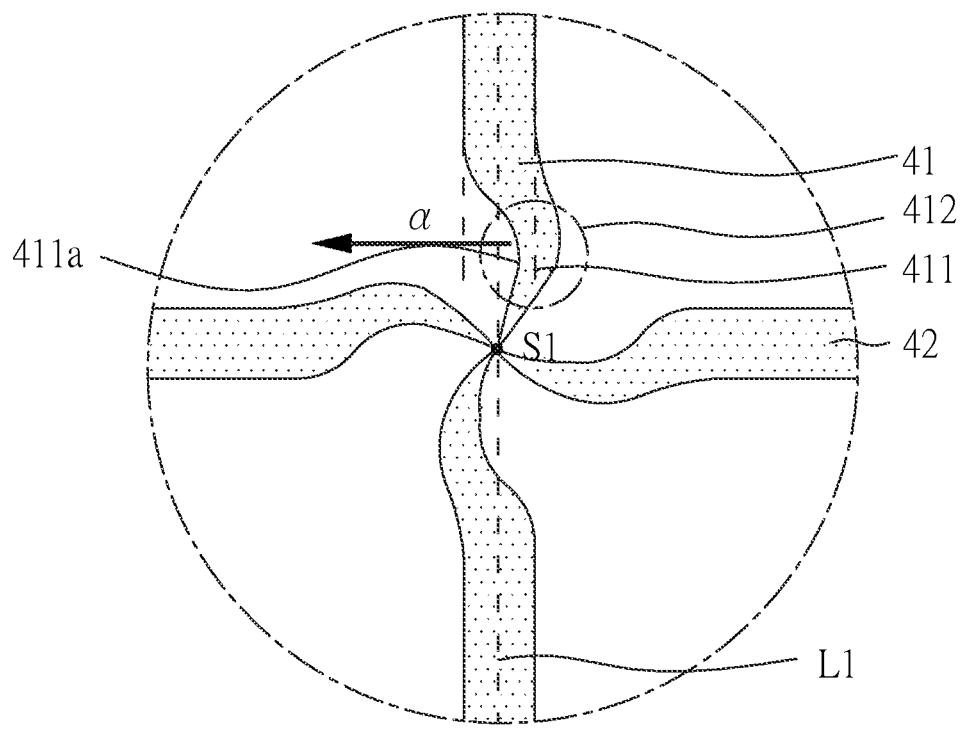
FIGS. 5A and 5B are respectively enlarged view of regions A and B in FIG. 4.
Figure 5B:
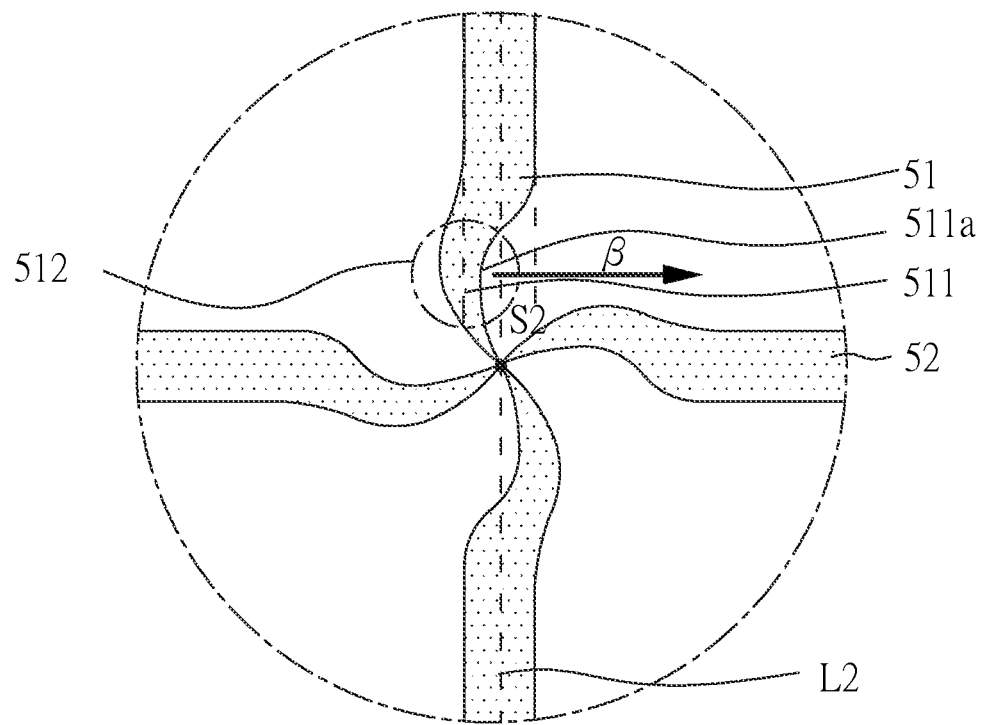

FIGS. 5A and 5B are respectively enlarged view of regions A and B in FIG. 4. As shown in FIGS. 2, 4, 5A and 5B, the first dark line 41 comprises a first arc portion 411 at the first cross site S1 near to the third side 11c (or the first scan line 121); that is the first dark line 41 comprising the first arc portion 411 between the first cross site S1 and the third side 11c (or the first scan line 121). In addition, the third dark line 51 comprises a second arc portion 511 at the second cross site S2 near to the third side 11c (or first scan line 121); that is the third dark line 51 comprising the second arc portion 511 between the second cross site S2 and the third side 11c (or the first scan line 121). Herein, a first concave side 411a of the first arc portion 411 faces to the first side 11a (or the first data line 131) which is indicated by the direction α in FIG. 5A, and a second concave side 511a of the second arc portion 511 faces to the second side 11b (or the second data line 132) which is indicated by the direction β in FIG. 5B.

On the other hand, as shown in FIGS. 2, 4, 5A and 5B, the first dark line 41 comprises a first protrusion part 412 at the first cross site S1 near to the first scan line 121 (or the third side 11c), and the third dark line 51 comprises a second protrusion part 512 at the second cross site S2 near to the first scan line 121 (or the third side 11c). Herein, the first protrusion part 412 locates at a side of the first dark line 41 near to the second data line 132 (or the second side 11b) and more specifically, the first protrusion part 412 locates at a side of a central line L1 along a longitude direction of the first dark line 41 near to the second data line 132 (or the second side 11b). In addition, the second protrusion part 512 locates at a side of the third dark line 51 near to the first data line 131 (or the first side 11a) and more specifically, the second protrusion part 512 locates at a side of a central line L2 along a longitude direction of the third dark line 51 near to the first data line 131 (or the first side 11a).

As shown in FIG. 4, preferably, the spin directions of the dark lines in any two adjacent sub-pixel units are different. Herein, the term "spin direction" indicates that a clockwise or counter-clockwise direction is obtained by the facing directions of the concave sides of each arc portions, based on the cross site as a central point.

Compared to the display panel in which the dark lines have identical spin directions, the dark lines having different spin directions are alternately arranged in the display panel of the present embodiment and more particularly, the dark lines in any two adjacent sub-pixel units in the display panel of the present embodiment are designed to have different spin directions; and thus the convergence of the liquid crystal molecules can be improved and therefore a better light transmittance of the display panel can be obtained.

In addition, as shown in FIG. 2, the first electrode 15 is adjacent to the second electrode 16. In the present embodiment, plural sub-pixel units such as the first sub-pixel unit P1 and the second sub-pixel unit P2 are disposed on the first substrate 11, and the first electrode 15 and the second electrode 16 respectively correspond to the first sub-pixel unit P1 and the second sub-pixel unit P2. Herein, the first sub-pixel unit P1 and the second sub-pixel unit P2 can be sub-pixel units having identical or different color. For example, the first sub-pixel unit P1 is a green pixel and the second sub-pixel unit P2 is a blue pixel; or both the first sub-pixel unit P1 and the second sub-pixel unit P2 are green pixels. However, the colors of the sub-pixel units are not limited to the aforementioned colors in the present invention.

Figure 6:
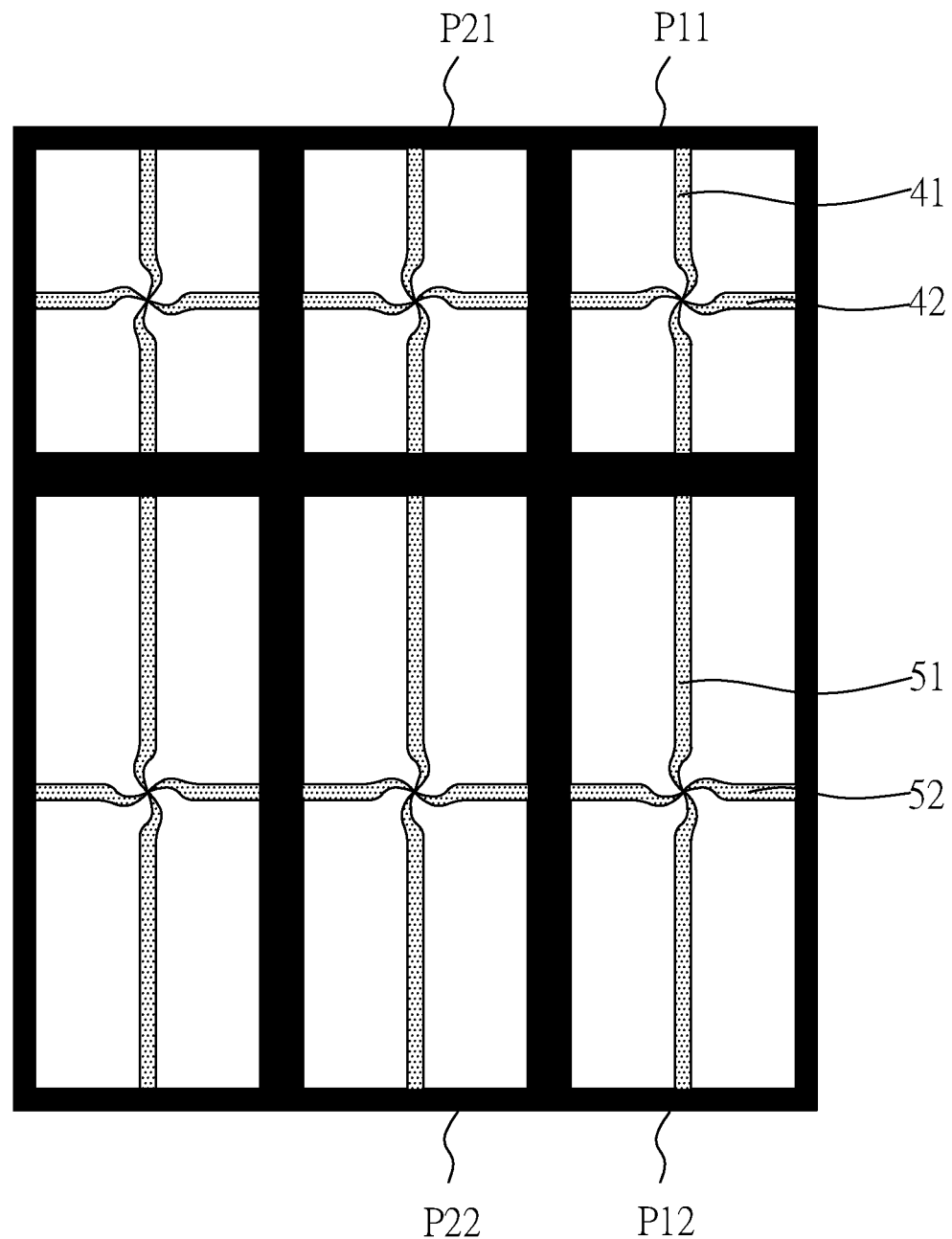
FIG. 6 is a perspective view showing dark lines corresponding to each sub-pixel unit in a LCD panel according to another preferred embodiment of the present invention.
Figure 7:
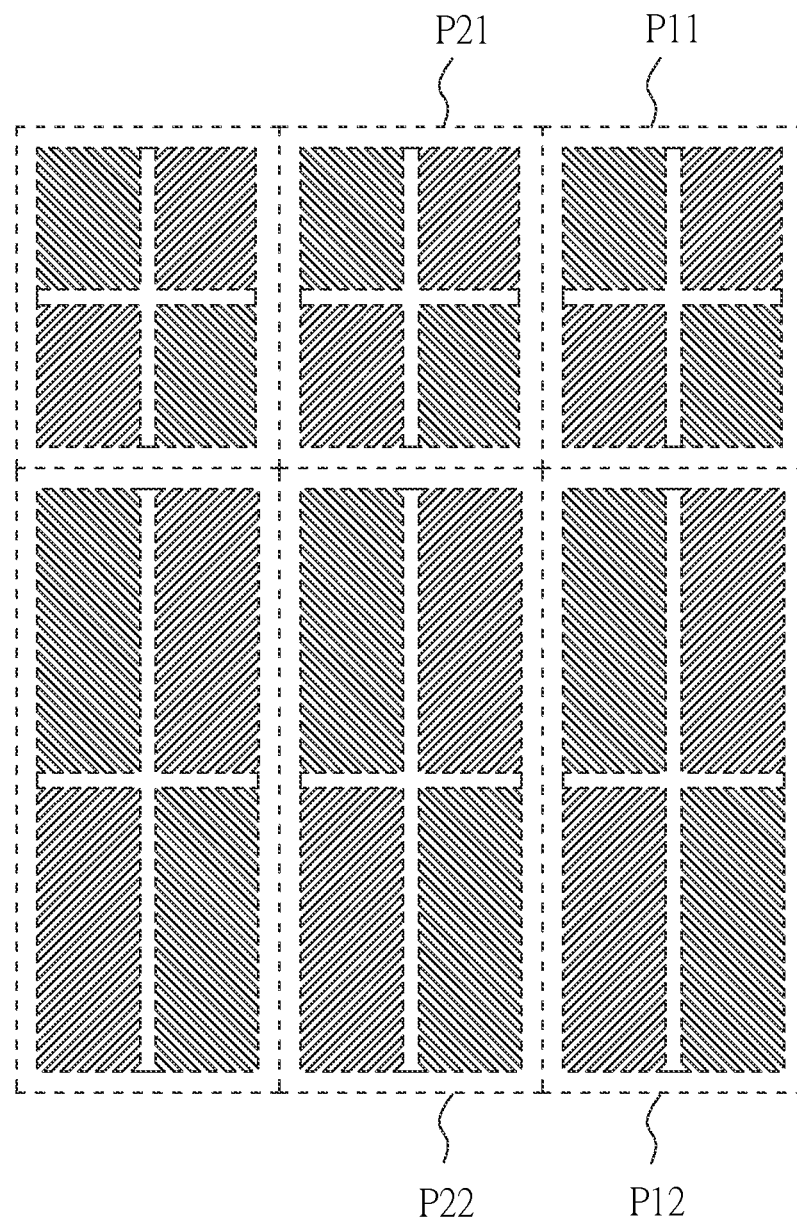
FIG. 7 is a perspective view showing electrodes corresponding to each sub-pixel unit in a LCD panel according to another preferred embodiment of the present invention.

FIG. 6 is a perspective view showing dark lines corresponding to each sub-pixel unit in a LCD panel according to another preferred embodiment of the present invention, and FIG. 7 is a perspective view showing electrodes corresponding to each sub-pixel unit. The features of the LCD panel of the present embodiment is similar to those illustrated in the previous embodiment, except that the first sub-pixel unit of the present embodiment comprises a first region P11 and a second region P12, wherein different display voltages are respectively applied to the first region P11 and the second region P12 or the first region P11 and the second region P12 can exhibit different luminance respectively. The second sub-pixel unit comprises another first region P21 and another second region P22, wherein different display voltages are respectively applied to the first region P21 and the second region P22 or the first region P21 and the second region P22 can exhibit different luminance respectively.

More specifically, in the present embodiment, plural sub-pixel units are disposed on the TFT substrate (not shown in the figure), such as the first sub-pixel unit comprising the first region P11 and the second region P12. When a voltage is applied to the first electrode and the second electrode so that light emitting from a backlight module (not shown in figure) passes through the LCD panel, at a side of the counter substrate, the first electrode and the second electrode respectively correspond to the second region P12 and the first region P11 in one sub-pixel unit.

Figure 8:
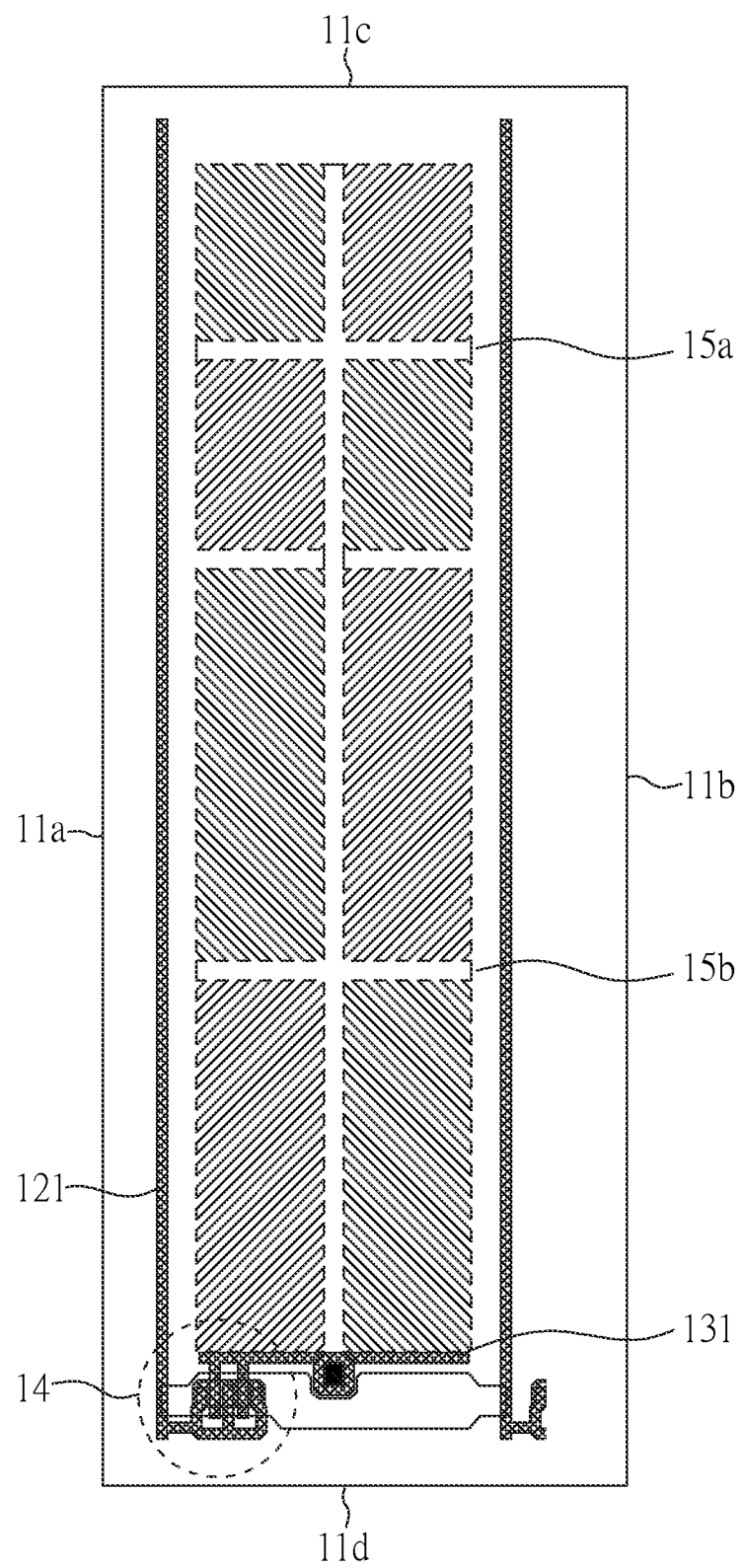
FIG. 8 is a perspective view of a part of a first substrate of a LCD panel according to another preferred embodiment of the present invention.

Herein, the structures of the electrodes corresponding to the second regions and the first regions of the first sub-pixel unit and the second sub-pixel unit are not particularly limited. For example, as shown in FIG. 8, the electrode 15a corresponding to the first region partially connect to the electrode 15b corresponding to the second region. However, in other embodiments of the present invention, the electrode 15a corresponding to the first region is isolated and does not connect to the electrode 15b corresponding to the second region. In addition, in other embodiments of the present invention, the area ratio of the second region P12 to the first region P11 in one sub-pixel unit can be adjusted if it is necessary.

Figure 9:
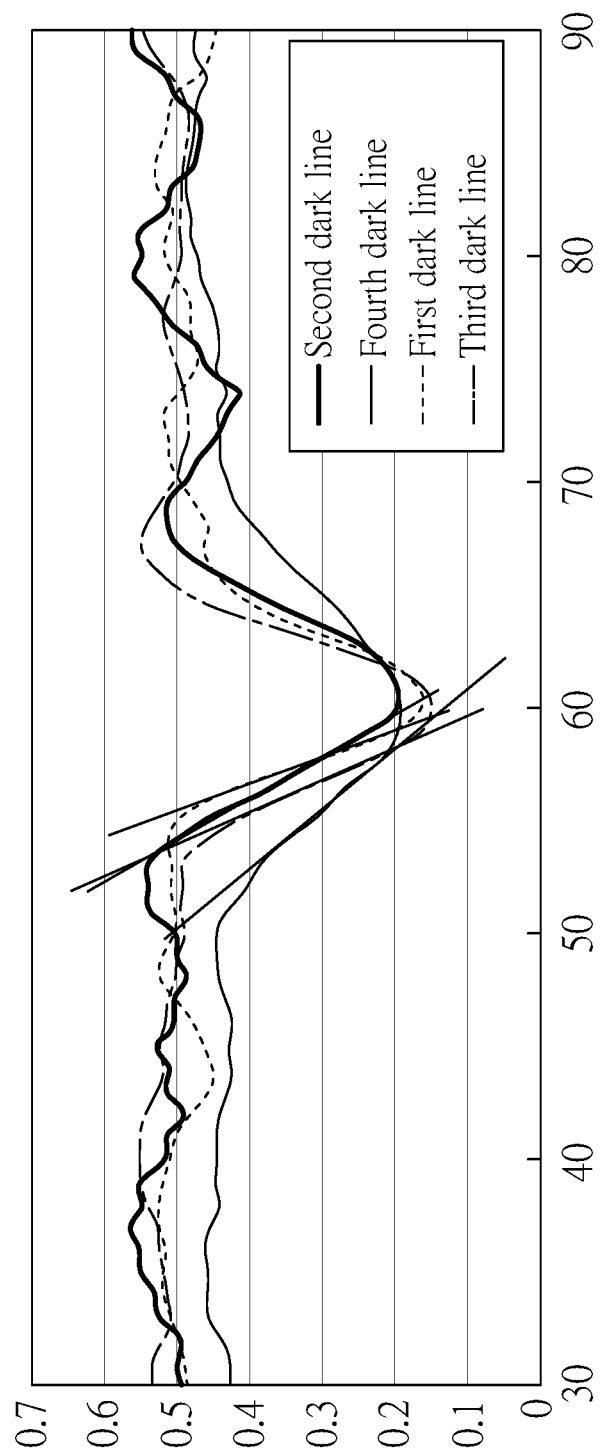
FIG. 9 is a graph showing an analysis result of dark lines with a spectrum analysis corresponding to each sub-pixel unit in a LCD panel according to another preferred embodiment of the present invention.

As shown in FIG. 6, a length of the first dark line 41 is larger than that of the second dark line 42 in the first region P11, and a length of the third dark line 51 is larger than that of the fourth dark line 52 in the second region P12. Herein, when light penetrates through the second region P12 and the first region P11, waves corresponding to the first dark line 41, the second dark line 42, the third dark line 51 and the fourth dark line 52 therein are respectively examined by a spectrum analysis. During the examination, the second region P12 and the first region P11 are present in white, the images at a maximum brightness thereof are taken by CCD, and the cross-shaped dark lines in the centers of the images are analyzed to obtain the brightness changes in a grey scale, which is further drawn into wave graphs. If there are noises in the brightness changes in a grey scale, a Fourier transfer method or a moving average method is used to remove the noises. The examination results are shown in FIG. 9.

Herein, a full width at half maximum (FWHM) of the dark line is a bandwidth obtained by half the difference between the wave through and the wave crest close to the wave through. In the present embodiment, slopes of the waves corresponding to the first dark line 41, the second dark line 42, the third dark line 51 and the fourth dark line 52 respectively at FWHM thereof are different to each other. Preferably, a slope of the wave corresponding to the second dark line 42 at FWHM thereof is smaller than that the first dark line 41 corresponding to at FWHM thereof, and a slope of the wave corresponding to the fourth dark line 52 at FWHM thereof is smaller than that corresponding to the third dark line 51 at FWHM thereof. Most preferably, a slope of the wave corresponding to the fourth dark line 52 at FWHM thereof is smaller than those corresponding to the first dark line 41, the third dark line 51 and the second dark line 42 respectively at FWHM thereof.

As shown in FIG. 6, in the present embodiment, the dark lines having different spin directions are alternately arranged in the first regions and the second regions of the sub-pixel units and more particularly, the dark lines in the first regions and the second regions in any two adjacent sub-pixel units are designed to have different spin directions. For example, as shown in FIG. 6, in the first region P11 of one sub-pixel unit, a clockwise spin direction can be obtained sequentially along the facing directions of the concave sides of the first dark line 41 and the second dark line 42 which is just like that indicated by the direction α in FIG. 5A; and in the second region P12 of the same sub-pixel unit, a counter-clockwise spin direction can be obtained sequentially along the facing directions of the concave sides of the third dark line 51 and the fourth dark line 52 which is just like that indicated by the direction β in FIG. 5B. That is, the concave sides of the dark lines face to different direction or the protrusion parts thereof are disposed on opposite two sides of the central lines thereof, and the convergence of the liquid crystal molecules can be improved and therefore a better light transmittance of the display panel can be obtained.

In addition, if the liquid crystal molecules corresponding to the dark lines having long axes (i.e. the first dark line 41 and the third dark line 51) and the dark lines having short axes (i.e. the second dark line 42 and the fourth dark line 42) are taken into account to have the maximum convergent effect simultaneously, the widths of the dark lines have to be adjusted by designing the patterns of the pixel electrodes or applying additional electric field during the photo-curing process for preparing the liquid crystal layer, to make the whole liquid crystal layer have best convergent effect. As shown in FIG. 9, since the area of the dark lines having the long axes is larger than that of the dark lines having the short axes in one sub-pixel unit, when the liquid crystal molecules corresponding to the dark lines having the long axes are designed to have better convergent effect than those corresponding to the dark lines having the short axes (that is, the slope of the wave corresponding to the dark lines having the long axes at FWHM thereof is larger than those corresponding to the dark lines having short axes at FWHM thereof), a best convergent effect of the whole liquid crystal layer can be achieved.

In the aforementioned embodiment, only the LCD panel with the TFT substrate and the counter substrate opposite thereto is disclosed. However, the TFT substrate provided by the present invention can also be applied to other types of LCD panels such as that equipped with a color filter on array (COA) substrate.

Furthermore, the display panel provided by the aforementioned embodiments of the present invention can be applied to any electronic device for displaying images, such as a mobile phone, a notebook, a camera, a video camera, a music player, a navigation system, or a television.

Although the present invention has been explained in relation to its preferred embodiment, it is to be understood that many other possible modifications and variations can be made without departing from the spirit and scope of the invention as hereinafter claimed.

What is claimed is:

1. A display panel, comprising:
   a first substrate, wherein a first data line, a second data line, a first scan line and a second scan line are formed on the first substrate, the second data line corresponds to the first data line, the first scan line intersects the first data line and the second data line, and the second scan line corresponds to the first scan line and intersects the first data line and the second data line; and
   a first electrode and a second electrode disposed on the first substrate and locating in a region defined by the first data line, the second data line, the first scan line and the second scan line, wherein the first electrode comprises a first trunk electrode and a second trunk electrode substantially vertical to each other, the second electrode comprises a third trunk electrode and a fourth trunk electrode substantially vertical to each other, and the first trunk electrode is substantially parallel to the third trunk electrode,
   wherein when light passes through the display panel, the first trunk electrode and the second trunk electrode respectively correspond to a first dark line and a second dark line which cross to each other to form a first cross site, the third trunk electrode and the fourth trunk electrode respectively correspond to a third dark line and a fourth dark line which cross to each other to form a second cross site, the first dark line comprises a first arc portion at the first cross site near to the first scan line, the third dark line comprises a second arc portion at the second cross site near to the first scan line, and a first concave side of the first arc portion faces to the first data line, and a second concave side of the second arc portion faces to the second data line;
   wherein a length of the third dark line is larger than a length of the fourth dark line, and waves corresponding to the third dark line and the fourth dark line are respectively obtained by a spectrum analysis, and a slope of the wave corresponding to the third dark line at a full width at half maximum thereof is larger than a slope of the wave corresponding to the fourth dark line at a full width at half maximum thereof.

2. The display panel as claimed in claim 1, wherein the first electrode is adjacent to the second electrode.

3. The display panel as claimed in claim 2, wherein plural sub-pixel units are disposed on the first substrate, and the first electrode and the second electrode correspond to the sub-pixel units having identical color.

4. The display panel as claimed in claim 2, wherein plural sub-pixel units are disposed on the first substrate, and the first electrode and the second electrode correspond to the sub-pixel units having different colors.

5. The display panel as claimed in claim 1, wherein plural sub-pixel units are disposed on the first substrate, and the first electrode and the second electrode correspond to one sub-pixel unit.

6. The display panel as claimed in claim 5, wherein the first electrode corresponds to a first region, the second electrode corresponds to a second region, a length of the first dark line is larger than a length of the second dark line, and a length of the third dark line is larger than a length of the fourth dark line; wherein when the light passes through the sub-pixel units and waves corresponding to the first dark line, the second dark line, the third dark line and the fourth dark line are respectively obtained by a spectrum analysis, a slope of the wave corresponding to the fourth dark line at a full width at half maximum thereof is smaller than slopes of the waves corresponding to the first dark line, the third dark line and the second dark line respectively at full widths at half maximum thereof.

7. The display panel as claimed in claim 1, wherein plural sub-pixel units comprising a first sub-pixel unit and a second sub-pixel unit adjacent to the first sub-pixel unit are disposed on the first substrate, the first electrode corresponds to the first sub-pixel unit, and the second electrode corresponds to the second sub-pixel unit.

8. The display panel as claimed in claim 1, wherein plural sub-pixel units comprising a first sub-pixel unit and a second sub-pixel unit are disposed on the first substrate, the first electrode corresponds to the first sub-pixel unit, and the second electrode corresponds to the second sub-pixel unit;

wherein when the light passes through the sub-pixel units and waves corresponding to the first dark line, the second dark line, the third dark line and the fourth dark line are respectively obtained by a spectrum analysis, slopes of the waves corresponding to the first dark line, the second dark line, the third dark line and the fourth dark line respectively at full widths at half maximum thereof are different to each other.

9. The display panel as claimed in claim 8, wherein a length of the first dark line is larger than a length of the second dark line, and a slope of the wave corresponding to the first dark line at a full width at half maximum thereof is larger than a slope of the wave corresponding to the second dark line at a full width at half maximum thereof.

* * * * *